Jan. 5, 1954    H. J. SMITS    2,664,758
MECHANICAL DRIVE
Filed Nov. 17, 1949
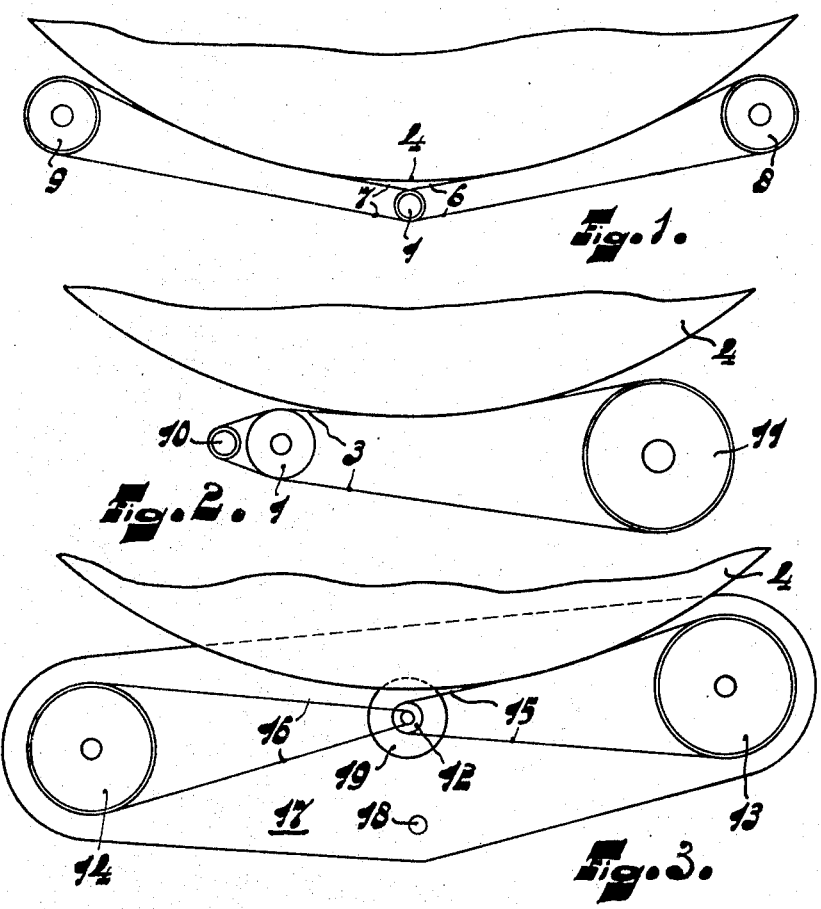
INVENTOR.
HUBERTUS JAN SMITS
BY
AGENT Patented Jan. 5, 1954

2,664,758

UNITED STATES PATENT OFFICE 2,664,758

MECHANICAL DRIVE

Hubertus Jan Smits, Eindhoven, Netherlands, assignor to Hartford National Bank and Trust Company, Hartford, Conn., as trustee Application November 17, 1949, Serial No. 127,907

Claims priority, application Netherlands November 24, 1948

3 Claims. (Cl. 74—221)

The invention relates to mechanical drives, particularly for gramophone turntables, comprising at least one endless belt engaging part of the circumference of the member to be driven and passing over pulleys, one of which is a driving pulley and arranged so that the parts of the belt lying between the pulleys are on the same side of the member to be driven.

Such drives comprising a single belt are known. In the most simple form, the belt passes over the driving pulley of a motor and a single guide pulley. Drives of this kind have an advantage over drives employing reduction gearing in that the transmission is free from play. Furthermore, the moment of inertia of the member to be driven must be comparatively high in the case of gear wheel transmission because of load variations occurring, but the moment of inertia may be materially reduced in the case of belt drives using high-speed motors.

As compared with an alternative known arrangement, in which the belt passes round the member to be driven without the use of a guide pulley, a further advantage is that vibrations of the driving shaft are transmitted to the member to be driven in a tangential direction only, so that they have a materially lower effect than in the last mentioned known arrangement without guide pulley, in which the vibrations are transmitted in a radial direction, because the parts of the belt lying between the driving pulley and the member to be driven engage the member on two opposite sides.

Compared with drives in which the driving pulley engages the circumference of the member to be driven directly or through an intermediate wheel, a belt drive has the advantage that the motor power may be materially lower, since contact between the belt and the member to be driven may take place over a much greater part of the circumference with consequent lower contact pressure, so that frictional losses are lower.

A draw-back of the known drives described above, of the type to which the present invention relates, is that the radial pressure on the driving shaft bearing is high owing to the tension and the resultant frictional losses of the belt. In the application to gramophones the driving shaft is usually journalled on one side and at a comparatively great distance from the driving pulley, owing to the fact that the driving pulley and the driving motor are found on either side of the mounting plate, the motor being resiliently mounted to the latter. If in this case the aforesaid drive is applied, the pull exerted by the belt at one side of the bearings results in a very high radial pressure in the latter, which absorb an amount of energy which is high compared with the useful energy consumed by the shaft to be driven.

This is particularly inefficient in case the needle pressure of the scanning system exercised on the sound track is only some 5 to 10 grms.

According to the present invention, a driving mechanism, particularly for a gramophone turntable, comprising at least one endless belt, which engages part of the circumference of the member to be driven and which passes over pulleys, one of which is a driving pulley, and arranged so that the parts of the belt lying between the pulleys are on the same side of the member to be driven is characterized in that in addition to the driving pulley two further pulleys carrying the belt or belts are arranged, one on each side of the driving pulley and at the limits of the belt system so that the radial bearing pressure is reduced as compared with the case in which provision is made of one guide pulley only.

By arranging the further pulleys on the opposite sides of the driving pulley the radial bearing pressure is reduced as compared with the case in which only one guide roller is provided.

The device according to the invention is preferably constructed such that the driving pulley drives two belts or ropes, each of which engages part of the circumference of the member to be driven. This arrangement has the advantage that the torque which can be transmitted is increased, since it increases with the total angle of the contact of the belt with the circumference of the driven member.

The axes of the said further pulleys may lie in the same plane with the axis of the driving pulley, but it is then necessary for the further pulleys to be of larger diameter.

In this arrangement, the radial tensions of the belts on the driving pulley can be cancelled out if the two belts are under equal tension.

Alternatively, two guide pulleys of comparatively small diameters may be used, arranged so that planes through the driving pulley axis and the guide pulley axes are at an angle less than 180°.

In this arrangement, there will be a resultant radial tension on the driving pulley and, to keep this resultant small, the angle between the said planes should be as near 180° as is practicable.

The drive according to the invention may be used for driving machine tools in which a vibration-free spindle is required, as, for example, for some fine work.

In the simple case the driving shaft is the shaft of the driving motor, to which the driving pulley is attached but it is possible for the driving shaft and pulley to be coupled with the motor shaft through any transmission which is substantially free from back-lash.

The axes of the guide pulleys may be fixed or the pulleys may be resiliently mounted, the degree of resilience depending on the resilience of the belt used so as to provide the required pressure of the driving belt against the circumference of the driven member. If the axes of the pulleys are fixed, separate jockey pulleys may be used to provide the required belt tension.

In one form of the invention, a single belt is used. This passes over two guide pulleys mounted on opposite sides of the driving pulley and is in contact with the driven member along part of its length, between the driving pulley and one of the outer pulleys, the pulley axes being substantially in one plane.

In another form of the invention the driving pulley drives two belts which extend on opposite sides of the driving pulley. The shafts of the two guide pulleys are mounted so that they can be moved laterally to bring the surface of either one or the other of the two belts against the circumference of the driven member. The two belts pass round pulleys of different diameter mounted on the driving shaft to give different linear speeds to the two belts and consequently alternative driving speeds for the driven member. In this arrangement the axes of the driving and guide pulleys may all lie in one plane or in two planes subtending an angle at the driving pulley axis.

In the case of a gramophone turntable drive, the alternative speeds permit of playing records at the usual speed or playing so-called long-playing records at a lower speed with the same equipment.

Preferably the shafts of the guide pulleys are mounted on a common mounting plate which is pivotable to bring either of the driving belts into engagement with the turntable. By choosing a suitable pivot point, it may be arranged that the belt tensions are substantially unchanged for either speed. If desired, the required driving belt pressure against the turntable circumference may be maintained by applying a moment to the mounting plate about its pivot and in the direction of the turntable as, for example, by a resilient mounting.

As an alternative to displacing the guide pulley shafts, the axis of the turntable may be moved to engage one or other of the driving belts while maintaining a constant distance from the tone arm pivot and the tone arm and turntable may be supported from a common mounting plate so as to move together for this purpose.

The drive is particularly useful for driving gramophone turntables, since in this case the requirement for a vibration-free drive is stringent and for this reason examples of the invention are described in detail below with reference to this application.

In order that the invention may be readily carried into effect, three examples will now be described in detail with reference to the accompanying drawings of which Fig. 1 shows a gramophone turntable drive having two driving belts both of which engage the circumference of the turntable;

Fig. 2 shows a gramophone turntable drive having a single belt passing over two guide pulleys with an intermediate driving shaft.

Fig. 3 shows a gramophone turntable drive having two belts travelling at different speeds, either of which may be brought into engagement with the turntable circumference.

Referring to Fig. 1, two belts 6 and 7 pass round the same driving pulley 1 and, at their ends, pass over guide pulleys 8 and 9 respectively which are arranged one on either side of the driving pulley 1 at the limits of the belt system. Since the belts 6 and 7 run over equally large diameters of the driving pulley, they have the same linear speed and by a suitable choice of the diameters of the guide pulleys they are adapted to be simultaneously brought into engagement with the member to be driven, in this case the turntable 4. The torque which may be transmitted by this arrangement is twice that possible when using only one belt. The arrangement of the axes of the three pulleys is such that the planes through the driving pulley axis and the guide pulley axes are at an angle less than 180°. In this case the angle is 150°.

In Fig. 2, the two pulleys 10 and 11 act as guide pulleys for the belt 3 and the driving pulley 1 is arranged at such a point between the pulleys 10 and 11 that it drives the belt 3 at parts of its length which are not in engagement with the turntable 4. Since these contact areas are nearly opposite each other, the bearing pressure of the driving shaft is small. The diameter of guide pulley 10 and the spacing between the latter and the pulley 1 should not be small enough for the resultant of the radial forces exerted on two opposite sides of the shaft of pulley 1 in the bearing thereof to be substantially equal to the radial force which, in the absence of the guide pulley 10, would occur in the said bearing.

Referring to Fig. 3 the axes of the pulleys 12, 13 and 14 are arranged in a single plane and the central shaft 12 is the driving shaft for both the belts 15 and 16 which run over different circumferences of the driving pulley and thus have different linear speeds. The shafts of the guide pulleys 13 and 14 are mounted on a member 17, which is pivoted at 18 so as to permit of belt 15 or belt 16 being alternatively brought into engagement with the turntable 4, whilst the stress in the belts is substantially unvaried. As may be seen from the figure, the driving shaft with the roller 12 passes through an aperture 19 in the member 17.

What I claim is:

1. A turntable driving mechanism comprising a turntable, at least two endless belts and three guide pulleys, one of the said pulleys being a driving pulley, said belts being so arranged one on each side of the driving pulley at the limits of the said belts that both of the said belts engage the circumference of the said turntable to thereby drive said turntable.

2. A turntable driving mechanism comprising a turntable, two endless belts and three guide pulleys in drive relation with the said turntable, one of the said pulleys being a driving pulley, the said pulleys being so arranged that the planes passing through the said driving pulley axis and the other said pulley axes are at an angle of less than 180°.

3. In a phonograph, a driving pulley, at least two driven guide pulleys at opposite sides of said driving pulley, means to drive said driven pulleys by said driving pulley including two endless belts encircling said driven pulleys and said driving pulley, a turntable engaging a portion of each belt between said driving pulley and said driven pulleys, all of said pulleys being arranged so that planes passing through said driving pulley axis and said driven pulley axes form an angle of substantially 150° thereby reducing the radial tension on said driving pulley.

HUBERTUS JAN SMITS.

References Cited in the file of this patent
UNITED STATES PATENTS

| Number | Name | Date |
| --- | --- | --- |
| 365,051 | Crowell | June 21, 1887 |
| 1,152,377 | Altorfer | Aug. 31, 1915 |
| 1,169,854 | Merritt | Feb. 1, 1916 |
| 1,350,179 | Ransome | Aug. 17, 1920 |
| 2,509,054 | Davis | May 23, 1950 |